United States Patent [19]

Tournois

[11] 4,449,193

[45] May 15, 1984

[54] BIDIMENSIONAL CORRELATION DEVICE

[75] Inventor: Pierre Tournois, Paris, France

[73] Assignee: Thomson-CSF, Paris, France

[21] Appl. No.: 256,929

[22] Filed: Apr. 23, 1981

[30] Foreign Application Priority Data

Apr. 25, 1980 [FR] France ................................ 80 09386

[51] Int. Cl.[3] ..................... G06F 15/336; G06G 7/195

[52] U.S. Cl. .................................... 364/604; 364/820; 364/821; 364/861; 382/42

[58] Field of Search ............... 364/604, 728, 821, 861; 382/32, 34, 42; 343/5 MM

[56] References Cited

U.S. PATENT DOCUMENTS

| | | | |
|---|---|---|---|
| 3,816,722 | 6/1974 | Sakoe et al. | 382/34 X |
| 3,925,653 | 12/1975 | Otto | 364/861 X |
| 3,952,299 | 4/1976 | Hodge et al. | 382/34 X |
| 4,115,865 | 9/1978 | Beauvais et al. | 364/821 |
| 4,164,728 | 8/1979 | Marsh | 343/5 MM X |
| 4,244,029 | 1/1981 | Hogan et al. | 382/42 X |
| 4,347,511 | 8/1982 | Hofmann et al. | 343/5 MM X |

FOREIGN PATENT DOCUMENTS

| | | | |
|---|---|---|---|
| 1524301 | 9/1970 | Fed. Rep. of Germany | 364/728 |
| 1452084 | 8/1966 | France | 364/728 |
| 1542853 | 3/1979 | United Kingdom | 364/824 |

OTHER PUBLICATIONS

Das et al., Variable Format Radar Receiver Using a SAW Convolver, IEEE Transactions on Aerospace and Electronic Systems, vol. AES-, No. 6, Nov. 1978, pp. 843-852.

*Primary Examiner*—Felix D. Gruber
*Attorney, Agent, or Firm*—Oblon, Fisher, Spivak, McClelland & Maier

[57] ABSTRACT

A device which provides bidimensional correlation of an image obtained by the scanning of electromagnetic or acoustic waves of the reference image. The scanned image and the reference image are written into memories with a pair of memories storing the real and imaginary portion of the signal of the corresponding images. After analog conversion, the signals are placed on a carrier and correlated in a line-by-line manner through the use and elastic wave convolver. The output of the convolver is demodulated with a correlation signal being applied to an adder and the correlation image being stored with its real and imaginary portions in a set of memories to provide a bidimensional correlation of an image.

6 Claims, 9 Drawing Figures

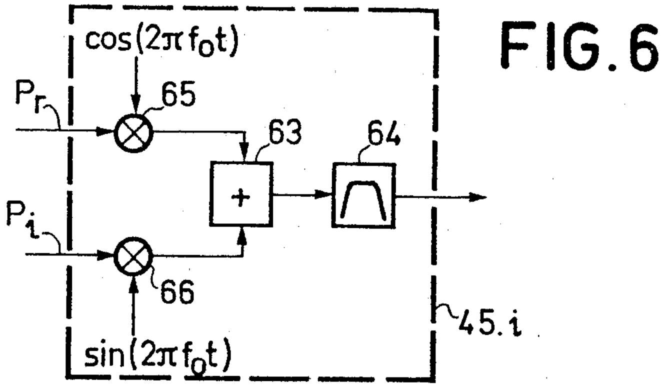
FIG.6
FIG.8
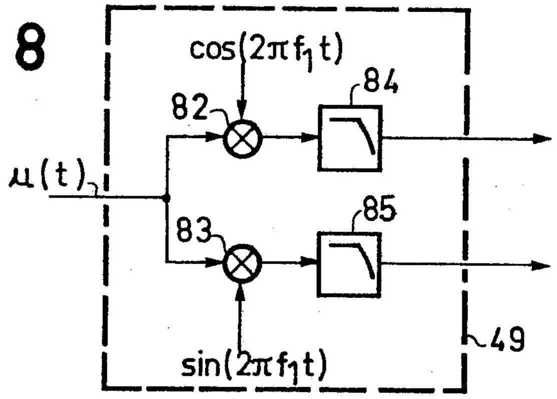
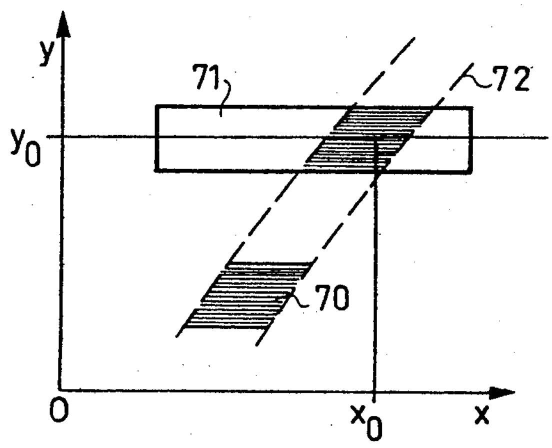
FIG.9

BIDIMENSIONAL CORRELATION DEVICE

BACKGROUND OF THE INVENTION

The present invention relates to the bidimensional correlation in real time of an image obtained line by line and a stored image. The correlation device supplies signals for correlating the image for certain numbers of lines with the stored image in the time corresponding to a line scanning.

The correlation device according to the invention is more particularly applicable to systems carried by a vehicle and which supply images such that the lines are repeated through the advance of the vehicle. It is more particularly applicable to imaging by radar, sonar or optics which must necessarily function in real time and for which there is a high image line recurrence rate, as well as to systems for which the volume and consumption of the means used must be reduced to the greatest possible extent. Examples of such systems are vehicle-carried systems for guiding, marking with reference points and recalibrating maps.

For example, in the field of submarine acoustic imaging high definition sonar systems are used for visually displaying the sea bed. In the field of aerial cartography, airborne radar systems or active or passive infrared systems are used.

These systems comprise a transmitting antenna which transmits signals in the form of infrared, electromagnetic or ultrasonic waves into all or part of the surrounding space. The signals received by the same antenna are processed in order to separate the energies coming from the different directions. The separation distance obtained is dependent on the angular resolution of the antenna, which is a function of the ratio between the wavelength $\lambda$ of the transmitted signals and the length L of the antenna, i.e. $\lambda/L$.

For example, in order to obtain a high resolving power it is known to use a side-looking radar antenna functioning as a multiple antenna, i.e. using the displacement of the carrying vehicle for synthesizing a greater antenna length.

In airborne systems, for carrying out aerial cartography by radar using a multiple side-looking antenna, the signals received are recorded on photographic film and then processed to restore the true image. Processing consists of correlating the signals with the reference signal which is a function of the vehicle displacement and the distance from the object. Consequently, a large quantity of data are collected and correlation takes a long time. These operations are carried out optically by reading the film in the manner described e.g. in an article by L. J. Cutrona et al (Proceedings IEEE, Vol. 54, No. 8, 1966, p. 1026).

In other applications using radar signals, where the correlation functions and also convolution functions play an important part, processing takes place digitally, because the precision and flexibility levels are higher. These operations are mainly directed at measurements of the arrival, classification and identification times of the signals. Bearing in mind the calculation speed, the digital devices have significant overall dimensions and an excessive power consumption for airborne or submarine systems.

BRIEF SUMMARY OF THE INVENTION

To obviate these disadvantages, the correlation device according to the invention uses for correlation purposes elastic wave components which are particularly suitable for the rapid processing of analog signals. An application to the processing of radar signals is given in the following articles:

(1) J. B. C. ROBERTS, AGARD Conference Proceeding No 230 (1977) and (2) J. D. MAINES AND E.G.C. PAIGE PROC. IEEE, Vol. 64, No. 5 (1976).

More specifically, the present invention relates to a device for the bidimensional correlation between a reference image of a plane Oxy and having lines oriented in the Ox direction and an image obtained by scanning in the plane Oxy, the scanned lines being parallel to Ox, wherein the device includes a modulator which receives an electrical indication of the reference image and the scanned image in order to provide a modulated output signal to a correlation device which includes a surface wave convolver. A portion of the modulated signal corresponds to a scan line of the scanned image and a corresponding line of the reference image in order to provide through the correlation device a monodimensional correlation line formed from the displacement of the reference image and the scanned image. The device further utilizes a demodulator connected to the output of the correlator and an adder circuit to receive the output of the demodulator to add the signals for the points which correspond to the displacement for each of the monodimensional correlation lines of the images in order to supply from the output of the adder a bidimensional correlation signal so that the total device supplies a new bidimensional correlation line after each new scanned line of the image obtained by scanning.

BRIEF DESCRIPTION OF THE DRAWINGS

Other features and advantages of the invention can be gathered from the following description, with reference to the attached drawings, wherein show:

FIG. 6 the diagram of circuits for placing a complex signal on a carrier.

FIG. 8 a diagram of circuits for obtaining complex components of the correlation signal.

FIG. 9 the diagram showing the calibration of a scanned image on the basis of correlation signals.

DETAILED DESCRIPTION OF THE PREFERRED EMBODIMENTS

Figure 1:
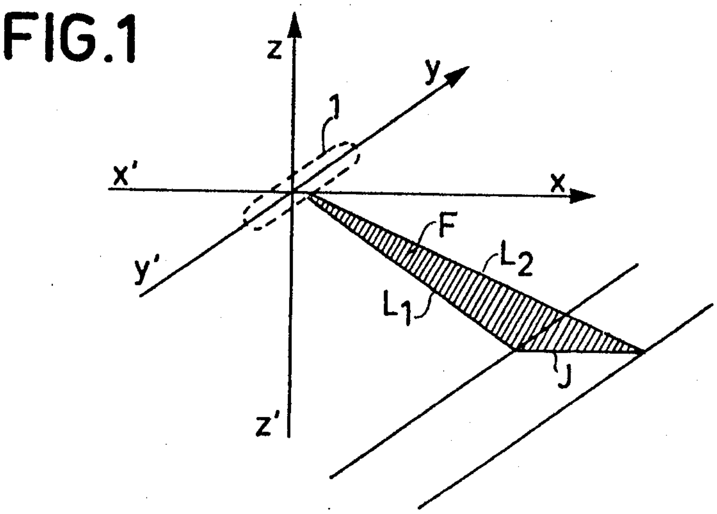
FIG. 1 a scanning diagram of a plane Oxy obtained by the advance of a vehicle provided with a transmitting and receiving antenna.

FIG. 1 shows an example of side-looking imaging. The antenna is mounted on vehicle 1 travelling in direction yy′ and both transmits and receives along beam F, which intercepts the object plane along a line J parallel to the axis xx′.

The image points forming this line J correspond to a distance between $L_1$ and $L_2$. The resolution along yy′ corresponds to the angular width at half the power of beam F, whilst the resolution along xx′ is inversely proportional to the frequency band of the transmitted signals. By advancing vehicle 1 a succession of lines is obtained forming an image in the B mode.

In other systems, several beams F can be simultaneously formed on reception, making it possible to obtain several lines forming an image. The thus obtained image lines are stored and used for correlation with an already stored image.

The monodimensional correlation functions of two signals $s_1$ and $s_2$ dependent on the dimension x is:

$$C(l) = \int_X s_1(x) \cdot s_2(x - l)dx \quad (1)$$

in which X is the dimension of the space for which the function corresponding to a displacement l along Ox is calculated.

The bidimensional correlation function of two signals $s_1$ and $s_2$ dependent on two dimensions x and y is written:

$$C(l, m) = \int_X \int_Y s_1(x, y) \cdot s_2(x - l, y - m)dx\, dy \quad (2)$$

in which X and Y are the dimensions of the space for which the function corresponding to a displacement l along Ox and a displacement m along Oy is calculated.

It is possible to obtain in a simple manner the bidimensional correlation function of two images in the case where one of the two images is obtained by a system like that of FIG. 1, whilst the other image is fixed. Thus, in this case, the displacement in the vehicle movement direction, e.g Oy takes place automatically as a result of the advance of the vehicle.

Figure 2:
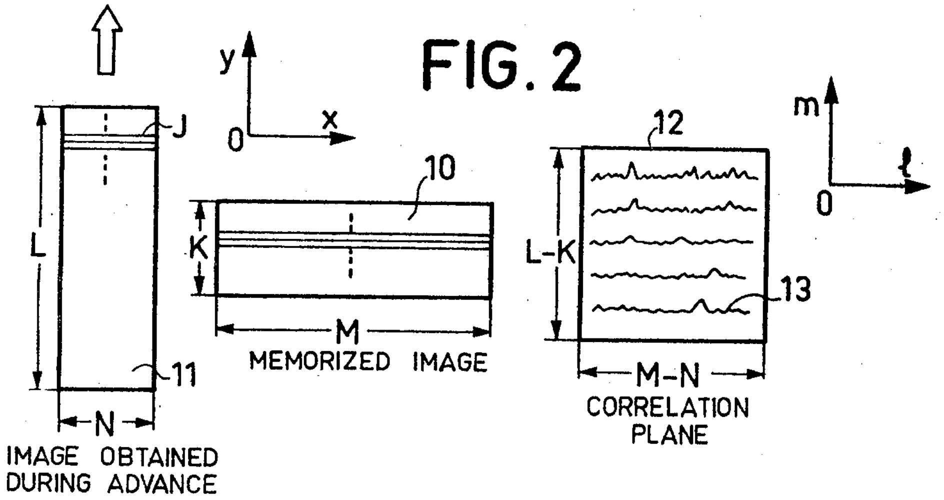
FIG. 2 the principle of the bidimensional correlation of two images.

The correlation principle between a fixed image and an image obtained by scanning is shown in FIG. 2. The fixed image 10 comprises K lines of M points and the scanned image 11 comprises L lines, such as J of N points. Scanning takes place parallel to direction Ox. FIG. 2 relates to the case of K less than L and M greater than N.

The operating principle of the device according to the invention is as follows. In accordance with dimension X and on a line by line basis the K first lines of the scanned image 11 are correlated with K lines of the fixed image 10 to obtain K lines of (M-N) points of the monodimensional correlation function C(l) in the direction Ox(1), each point corresponding to a displacement l.

The M points corresponding to the same displacements l are summated over all the K lines to obtain M-N bidimensional correlation points C (l,m) for a displacement m along Oy (2), said M-N points forming a correlation line such as 13.

The same process is repeated with lines 2 at K+1 of image 11 supplying a second bidimensional correlation line and so on until L-K correlation lines of M-N points are obtained forming the bidimensional correlation 12 of the images 10 and 11.

This principle applied to the imaging systems referred to hereinbefore naturally leads to the extension of the line by line displacement of the image 11 by the advance of the vehicle in accordance with Oy and the system can therefore supply an image 11 formed solely of K lines.

A correlation line 13 is obtained whenever an image line 11 is repeated. The proposed device makes it possible, through the use of acoustic convolvers, to obtain a bidimensional correlation line in a time slot which is generally less than the recurrence period of the image lines obtained by the imaging systems using a vehicle, as will be shown hereinafter.

The proposed device applied to imaging systems thus supplies the bidimensional correlation function of two images in real time.

Figure 3:
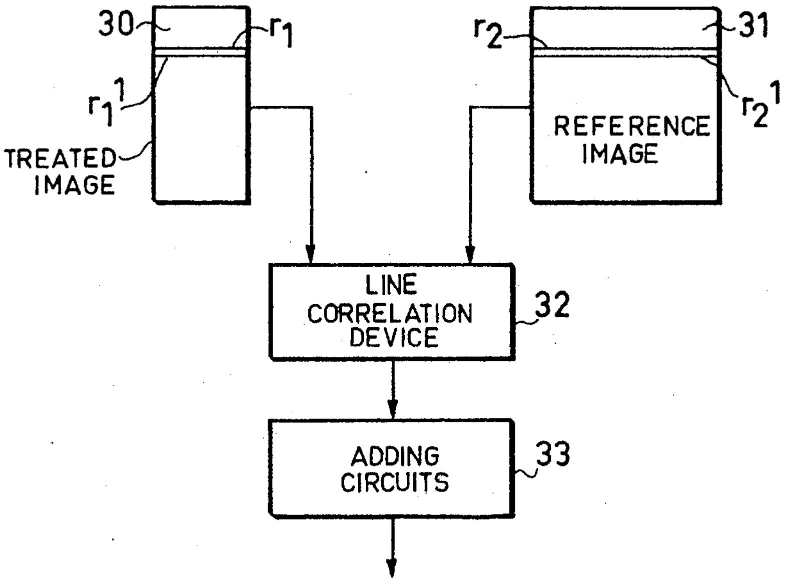
FIG. 3 a simplified flow chart of the bidimensional correlator.

The diagram of FIG. 3 shows the organization of the correlation device of the two images 30, 31. Only two consecutive lines $r_1$, $r^1{}_1$ of image 30 and $r_2$, $r^1{}_2$ of image 31 are shown. The two images 30, 31 are correlated line by line, $r_1$ with $r_2$ and then $r^1{}_1$ with $r^1{}_2$, etc in a correlating device 32. On each occasion when two lines, e.g. $r_1$ and $r_2$ are correlated, the correlating device supplies a monodimensional correlation line formed from points, each corresponding to a certain displacement l. In circuit 33, the points of all the correlation lines are added by displacement l and when all the image lines 30, 31 have been processed, circuit 33 supplies a line of the bidimensional correlation corresponding to a displacement M in the line by line displacement direction of one of the two images.

The correlating device 32 can, for example, be constituted by a computer which can also comprise circuit 33. Preferably, it is constituted by an analog device formed by an acoustic convolver.

Figure 4:
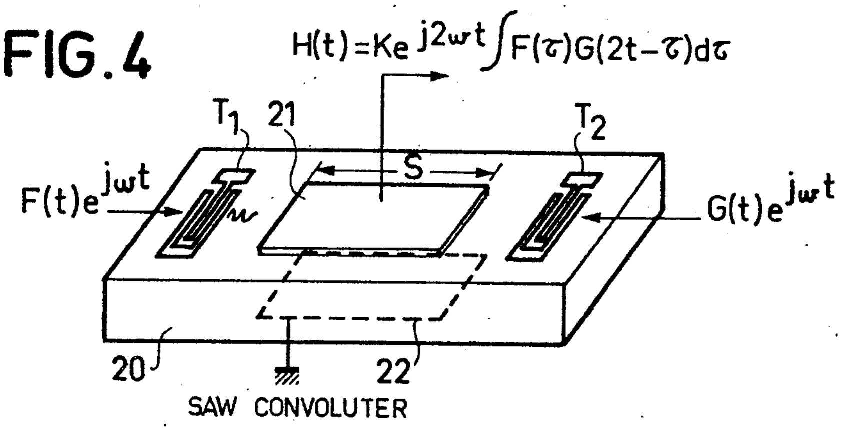
FIG. 4 an elastic wave convolver.

FIG. 4 shows the known principle of the elastic wave convolver. It comprises a piezoelectric material member 20 comprising at its two ends, two inter-digital transducers $T_1$ and $T_2$ between which is located a pair of planar electrodes 21, 22. The two signals whose convolution F(t) and G(t) is to be obtained are modulated by a carrier of pulsation $\omega$ able to generate acoustic waves in member 20.

These signals are applied to transducers $T_1$ and $T_2$ and the two oppositely directed acoustic waves transmitted in this way are in form: $F(t-z/v)e^{j(\omega t-kz)}$ and $G(t+z/v)e^{j(\omega t+kz)}$ in which z is the coordinate for the waves at a velocity v and k the wave numbers $\omega/v$. Due to the non-linear properties of the substrate, between the terminals of the two electrodes 21 and 22 a signal $$H(t) = K_C e^{2j\omega t} \int F(\tau) \cdot G(2t - \tau)d\tau$$

is obtained in which $K_C$ is linked with the energy efficiency.

Signal H(t) represents the convolution function of F and G, compressed in time in a ratio 2 and in a time slot corresponding to the time during which the two signals interact over the entire length S of the electrodes 21 and 22 along the propagation axis. Thus, if the two signals occured at the same time only a single correlation function point would apply. However, if the two signals have a different time, a number of valid correlation points equal to the difference between the number of points of the two signals is obtained.

In general, for the purpose of increasing the efficiency of such devices, acoustic beam compressors or a semiconductor material wafer placed between electrodes 21 and 22 and member 20 are used.

Figure 5:
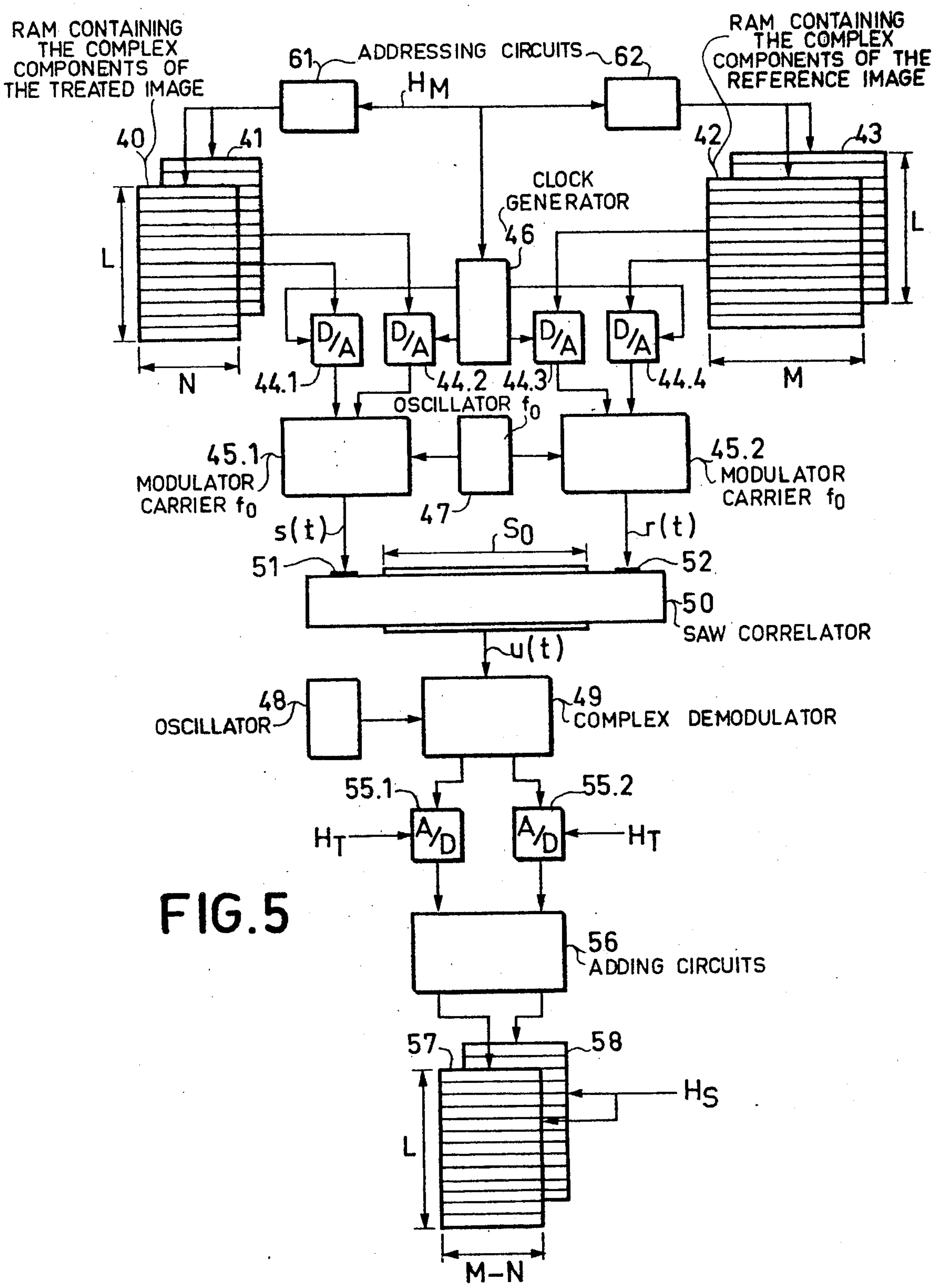
FIG. 5 the diagram of a bidimensional correlator for stored images with correlation by an elastic wave convolver.

Correlator operation requires the inversion in time of one of the signals. This operation can easily be performed when the signals are stored in a memory because it is merely necessary to read-out in the opposite direction to writing. An example of the use according to the invention is illustrated by the diagram of FIG. 5 in connection with the processing of signals corresponding to the two images to be correlated. In order to maintain both the amplitude and phase information, each signal has two components called complex components. The two signals are stored in the form of complex digital samples in random access memories (RAM). For simplification purposes, only the read circuits of these memories are shown. Thus, the real and imaginary parts of the signal representing the image moving line by line are stored line by line in memories 40 and 41, whilst the real and imaginary parts of the reference signal are also stored line by line in memories 42, 43.

The digital samples of the stored signals are rapidly read line by line at the rate of a clock signal $H_M$ supplied by generator 46. Clock signal $H_M$ is applied to addressing devices 61, 62 which supply the addresses of RAM 40, 41, 42 and 43.

The clock signal also controls the analog-digital conversion rate of the samples read in converters 44.1, 44.2, 44.3 and 44.4 in such a way as to synchronize the transmission of two signals on two modulating circuits 45.1 and 45.2. FIG. 6 shows a modulating circuit for bringing onto a carrier frequency. It is of a conventional type and is formed by two multipliers 65, 66 of cos $(2\pi f_o t)$ and sin $(2\pi f_o t)$, where the frequency $f_o$ is supplied by a local oscillator 47. The real part $P_r$ of each of the input signals is multiplied by the cosine term, whilst the imaginary part $P_i$ is multiplied by the sine term. The two signals obtained are then added in a circuit 63 and the resulting signal filtered in a band-pass filter 64 centred on $f_o$ of band $B_o$, which is a function of the frequency of clock signal $H_M$.

The two signals s(t) and r(t) obtained at the output of the two modulators 45.1 and 45.2 are transmitted, after amplification, to the transducers of the piezoelectric convolver device 50, whose centre frequency is equal to $f_o$ and the band equal to $B_o$.

If $T_H$ is the period of the signal of the control clock $H_M$, N and M respectively the number of samples per line in image memories 40, 41 and reference memories 42, 43, the times of signals s(t) and r(t) corresponding to each read line are respectively equal to $NT_H$ and $MT_H$.

Figure 7:
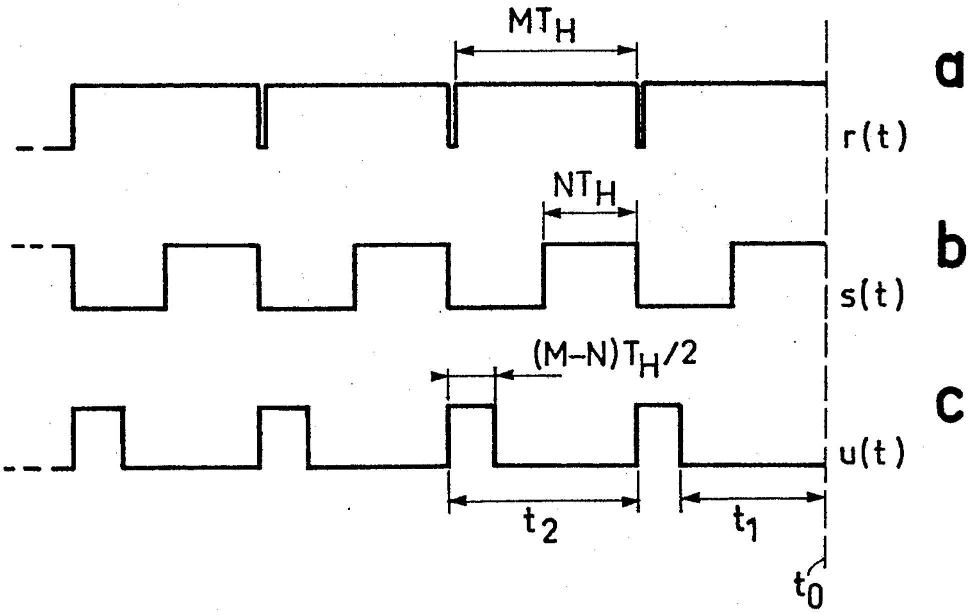
FIG. 7 a number of time signals.

The time diagram of the input and output signals of convolver 50 is indicated in FIG. 7 when M equals 2N. At time $t_o$, the two signals r(t) and s(t) respectively represented on lines a and b are transmitted to two transducers 51, 52 (FIG. 5) spaced by a length $S_o = MT_H.v$, if v is the velocity of the elastic waves in the piezoelectric member. Bearing in mind the time compression by a factor 2, the signal obtained u(t) represented on line c has a duration equal to $$\frac{(M-N)T_H}{2}$$

and is displaced with respect to the input signals by a time equal to $$t_1 = \frac{(M+N)T_H}{2}.$$

Moreover, it is at frequency $f_1 = 2f_o$ as is shown by formula (2).

Signal u(t) is transmitted into a demodulating circuit 49 shown in FIG. 8 in which the signal is multiplied in circuits 82, 83 by sin $(2\pi f_1 t)$ and cos $(2\pi f_1 t)$, the frequency $f_1$ being supplied by a local oscillator 48, the two signals obtained then being filtered in two low-pass filters 84, 85, whose cut-off frequency is close to $B_o/2$.

At the output of demodulator 49 the two signals are transmitted into two sampling-coding circuits 55.1 and 55.2 controlled by a clock signal $H_T$, whose period or cycle is half that of $H_M$, the signals being restored to the form of digital samples.

At the output from each of the circuits 55.1 and 55.2 for one process line and at rate $MT_H$, M-N coded samples are obtained on a number of bits n chosen for example equal to the original number of bits in the memories and occupying a time $(M-N)T_H/2$.

These M-N samples corresponding for example to line i+1 are added to the M-N samples from the sum of the samples of i preceding lines in a circuit 56 formed by a buffer memory, an accumulator with M-N locations of n bits and one or more adders. Thus, the samples of each of these two registers are sequentially or in parallel added location by location in a time slot at the most equal to $t_2 = MT_H$. When all the L lines hve been processed, the M-N samples obtained are stored in a line of memories 57, 58 at the rate of a clock $H_S$ of the same period as $H_M$ forming a bidimensional correlation line.

The thus described process repeats on each occasion that a line is repeated in the image memory. When a number L lines has been repeated, memories 57 and 58 are filled and correspond to the bidimensional correlation of the reference image with the image which has travelled line by line on L lines. The number of correlation lines at the output can be of a random nature. However, as from a number L of lines formed the two original images corresponding to line i and to line i+L are entirely separate. The output signals of circuit 56 can be processed to obtain either the module or the phase, a single output memory then being used.

It is obviously possible to reverse the size of the memories, the copy then being smaller than the read image.

The device according to the invention can be used in the guidance of missiles by the recalibration of maps. In FIG. 9, a missile follows a trajectory 72 and at each instant acquires the image of a portion of the ground 70. Stored in a memory, it has a reference map 71 formed by a rectangular axis system Oxy and whose coordinate $y_o$ is known. The navigation systems inside the missile make it possible at each instant to supply an image, whose lines remain parallel to the axis Oy of the reference map. At the time when the ordinate of the read image is equal to $y_o$, the bidimensional correlation line corresponding to this instant has a maximum, whose position makes it possible to measure the abscissa $x_o$ and recalibrate the missile.

The device is applicable to airborne systems with radar and infrared, as well as submarine systems with sonar. In addition, if the missile is able to follow the same trajectory a number of times with a high degree of precision in a relatively long time interval, the device can be used for marking changes on the ground or on the sea bed. In particular, it can be used with satellites, bearing in mind the reduced overall dimensions for such missiles.

The device described can also be used for recognising shapes, the copy representing the shape to be recognised then having smaller dimensions than the read image.

In an exempified embodiment, the dimensions of the image and reference memories are for example:

line number L=100 number of points per line N=100 and M=400 digital samples on 8 bits.

These image and reference memories use dynamic MOS technology. By subdividing the memory into planes, whose cycles partly overlap, it is possible to read a memory point in 100 ns and the clock period $T_H$ is equal to this value or a clock frequency of 10 MHz.

The centre frequency $f_o$ and the band $B_o$ of the convolver are respectively chosen equal to 50 and 10 MHz. The duration $MT_H$ of the signal r(t) is equal to 40 μs and the length $S_o$ is close to 12 cm, leading to reduced overall dimensions.

The circuit 56 of FIG. 6 comprises a buffer memory with 8 bits×300 and an accumulator of 16 bits×300. As an addition operation takes place in a time of 50 ns, with a clock period of $H_T$, the time for adding 300 samples remains below $MT_H$, i.e. 40 μs using a single adder.

Thus, a bidimensional correlation line is obtained in 40 μs×100, i.e. 4 ms by using a single convolver. Obviously, higher operating speeds can be obtained by using a plurality of convolvers in parallel for the purpose of processing several lines in parallel.

For comparison, the fastest digital circuits make it possible to calculate one point of the correlation function in approximately the same time, where all the function is reconstituted by the convolver, i.e. a speed ratio of approximately 100.

In the indicated example, one line of the bidimensional correlation between a line of 100×100 and an image of 400×100 is obtained in 4 ms using a single convolver.

For processing in real time, this duration corresponds to the maximum duration which must be respected between two bidimensional correlations of images for two displacements in the vehicle advance direction. This duration corresponds to a distance travelled of approximately 1 metre at a speed of Mach 1 and this resolution is approximately that which is generally sought for ground scanning systems.

In the field of submarine acoustic imaging the resolution obtained at about 100 meters is approximately 15 centimeters. In the case of a boat travelling at 20 knots the repeat period of an image line is equal to 15 ms and only the use of the proposed device makes it possible to obtain the bidimensional correlation function in real time.

According to a variant of the invention, the digital memories 41, 42, 43 and 44 are replaced by CCD. These devices can have 512 stages and can be controlled at a frequency of 10 MHz, which makes their use possible. Furthermore, a CCD can be used in place of an acoustic convolver.

For the correlation of images obtained by optical methods, this correlation takes place on intensities and not on amplitudes. In this case, the reference image and the scanned image are respectively stored in a single memory such as 40 and 42 in FIG. 5.

What is claimed is:

1. A device for the bidimensional correlation between a reference image of a plane Oxy having lines oriented in the Ox direction and a scanned image obtained by scanning in the plane Oxy, the scanned lines being parallel to Ox, wherein said device comprises:

a correlation means including a surface wave convolver said correlation means connected to receive first signals corresponding to said reference image and second signals corresponding to said scanned image with said reference image being formed from K lines of M points and said scanned image being formed from L lines of N points, in which $L>K$ and $N<M$, wherein the K lines of the reference image are correlated line-by-line with all the systems of K lines such as i at $i+k-1$ of the scanned image in which 1 is less than or equal to i less than or equal to L minus K, whereby one line of the reference image is simultaneously inputted with one line of the scanned image in order to supply to said correlation means an electrical representation of a monodimensional correlation line formed from points corresponding to the displacement of said reference image and said scanned image thus supplying after summation for a same displacement α along Ox, (L-K) correlation lines of (M-N) points, wherein said first signals corresponding to the reference image are stored in a first pair of random access memories and said second signals corresponding to the scanned image are each stored in a second pair of random access memories which are read under the control of a clock with one of said first and second signals being read along Ox and the other of said first and second signals being read in the opposite direction along Ox;

digital to analog converter means connected to said random access memories for receiving the output of said random access memories;

modulation means for receiving the output of said digital-to-analog converter means and supplying a modulated signal placed on a frequency carrier $f_O$ to said correlation means;

demodulation means for demodulating the output of said correlation means and applying said demodulated signal to an analog-digital converter;

adder means which adds the output of said analog to digital converter and which thereby adds the signals for the points corresponding to one and the same displacement for said (M-N) monodimensional correlation lines of said reference image and said scanned image with the output of said adder means supplying a bidimensional correlation signal whereby said device for bidimensional correlation supplies a new bidimensional correlation line after each new scanned line of the image obtained by scanning.

2. A device for the bidimensional correlation between a reference image which is formed in a plane having lines oriented in the x direction and a scanned image obtained by scanning in the plane with the obtained scanned lines being parallel to the x direction, wherein said device comprises:

modulation means for receiving an electrical indication of said reference image and said scanning image in order to output a modulated signal;

correlation means including a surface wave convolver connected to the output of said modulation means wherein a portion of said modulated signal corresponds to a scanned line of said scanned image and a corresponding line of said reference image in order to provide from said correlation means an output in the form of a monodimensional correlation line formed from the displacement of said reference image and said scanned image;

demodulation means connected to the output of said correlation means for demodulating the output of said correlation means; and adder means which receives the output of said demodulation means thereby adding the signals for the points corresponding to the displacement for each of said monodimensional correlation lines of said reference and scanned images with the output of said adder means supplying a bidimensional correlation signal so that said device for bidimensional correlation supplies a new bidimensional correlation line after each new scanned line of the image obtained by scanning.

3. A bidimensional correlation device according to claim 2, wherein said convolver is of the charge transfer type.

4. A bidimensional correlation device according to claim 3, wherein the reference image is formed from K lines of M points and the scanned image is formed from L lines of N points, in which $L>K$ and $N<M$, the K lines of the reference image are correlated line by line with all the systems of K lines such as i at $i+K-1$ of the scanned image in which $1 \leqq i \leqq L-K$, thus supplying after summation for a same displacement l along Ox, (L-K) correlation lines of (M-N) points.

5. A bidimensional correlation device according to claim 4, wherein said reference and scanned images have complex components and wherein said bidimensional correlation device further comprises two pairs of memories for storing electrical indications of the complex components of the reference and the scanned image.

6. A bidimensional correlation device according to claim 5, wherein said memories are constituted by charge transfer devices.

* * * * *